United States Patent [19]

Motomura et al.

[11] Patent Number: 5,610,402

[45] Date of Patent: Mar. 11, 1997

[54] SCINTILLATION CAMERA

[75] Inventors: Nobutoku Motomura; Takashi Ichihara, both of Otawara, Japan

[73] Assignee: Kabushiki Kaisha Toshiba, Kawasaki, Japan

[21] Appl. No.: 412,016

[22] Filed: Mar. 28, 1995

[30] Foreign Application Priority Data

Mar. 30, 1994 [JP] Japan ..................... 6-060936

[51] Int. Cl.$^6$ .................................... G01T 1/164
[52] U.S. Cl. ..................... 250/369; 250/363.04
[58] Field of Search ............... 250/369, 363.04, 250/363.02

[56] References Cited

U.S. PATENT DOCUMENTS

| 5,249,124 | 9/1993 | DeVito ............... | 364/413.24 |
| 5,347,455 | 9/1994 | Ichihara ............ | 364/413.24 |

FOREIGN PATENT DOCUMENTS

| 4-142487 | 5/1992 | Japan ............... | 250/363.04 |

*Primary Examiner*—Constantine Hannaher
*Attorney, Agent, or Firm*—Oblon, Spivak, McClelland, Maier & Neustadt, P.C.

[57] ABSTRACT

First RI having a first photo-peak and a second photo-peak and second RI having a third photo-peak close to the second photo-peak are simultaneously dosed to a test body. A first injection number is the number of energy injections in the vicinity of the first photo-peak from first RI. A second injection number is obtained as a sum of the third injection number in the vicinity of the second photo-peak from the first RI, and the fourth injection number of energy injections in the vicinity of the third photo-peak from the second RI. The third injection number is obtained on the basis of a predetermined coefficient and the first injection number. Therefore, the injection number of all γ rays emitted from the first RI is obtained on the basis of the third injection number and the first injection number. In addition, all the γ rays emitted from the second RI can be obtained on the basis of the third injection number and the second injection number. The problem of cross-talk can be solved thereby.

18 Claims, 4 Drawing Sheets

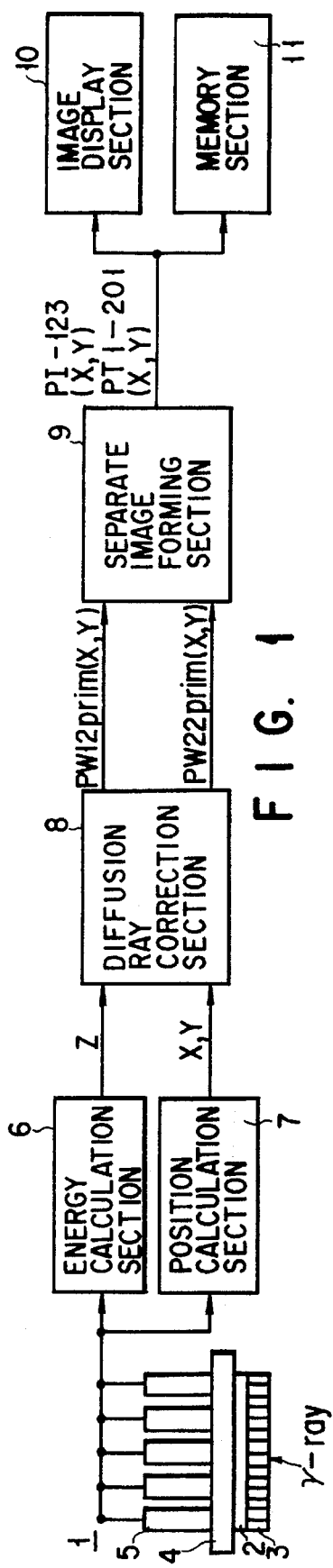
F I G. 1
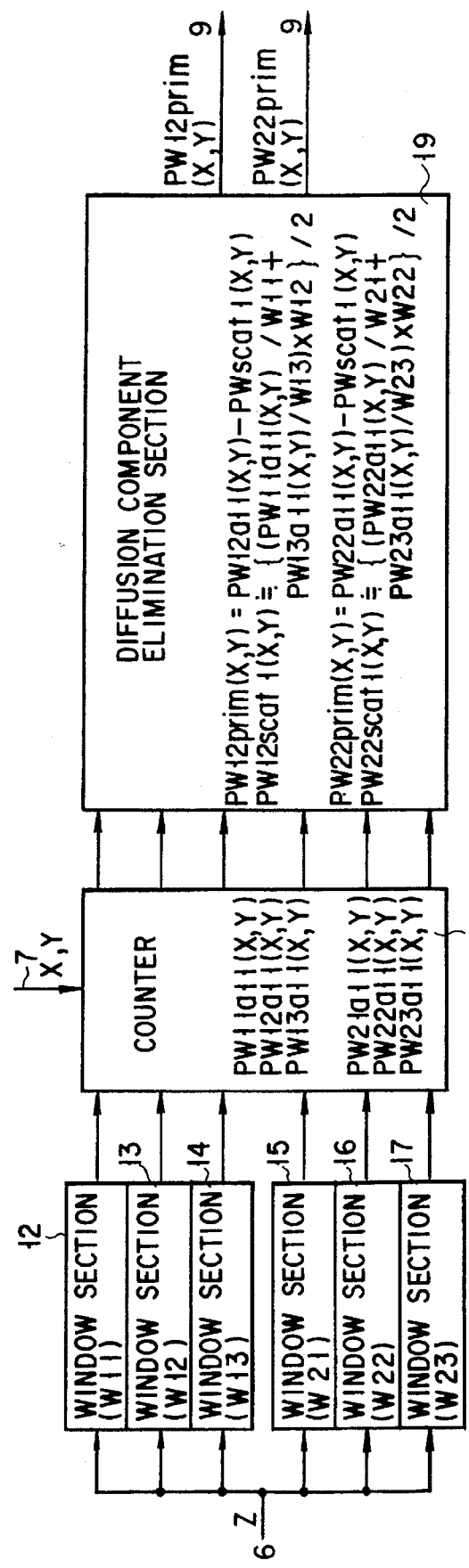
F I G. 2

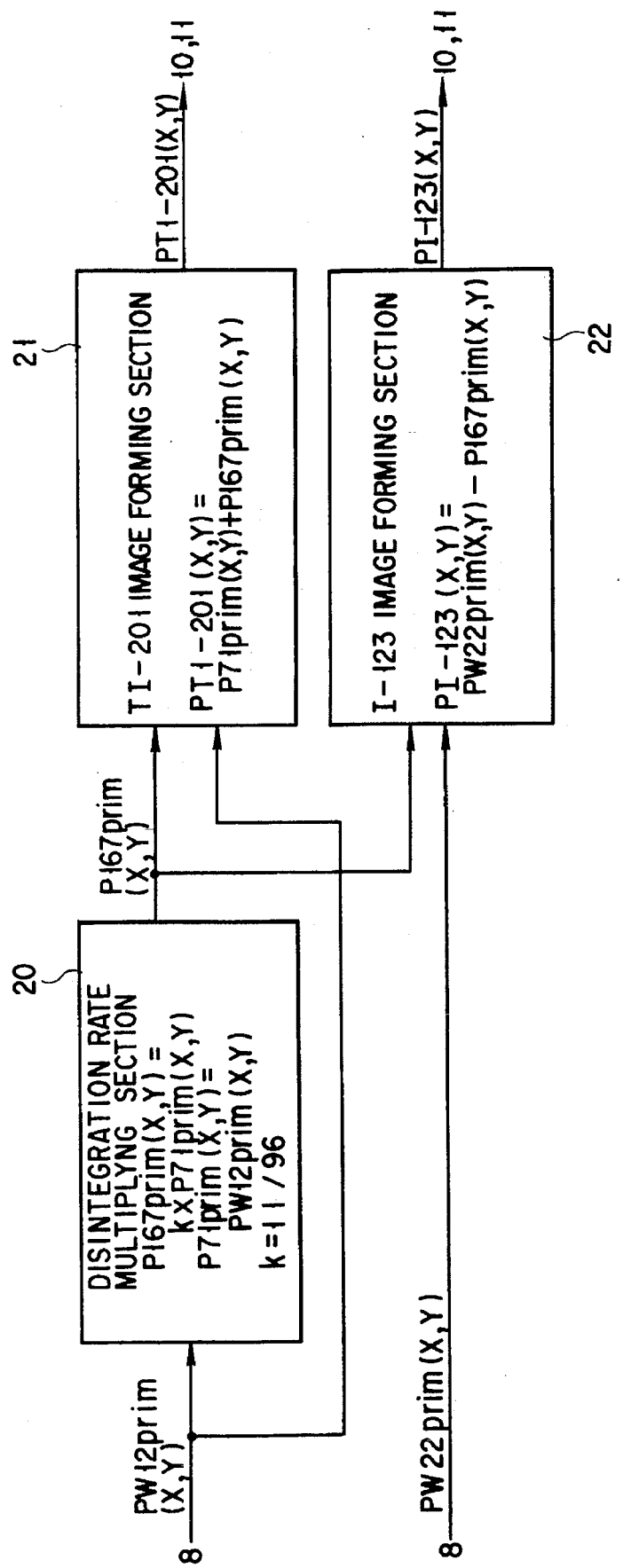
F I G. 3

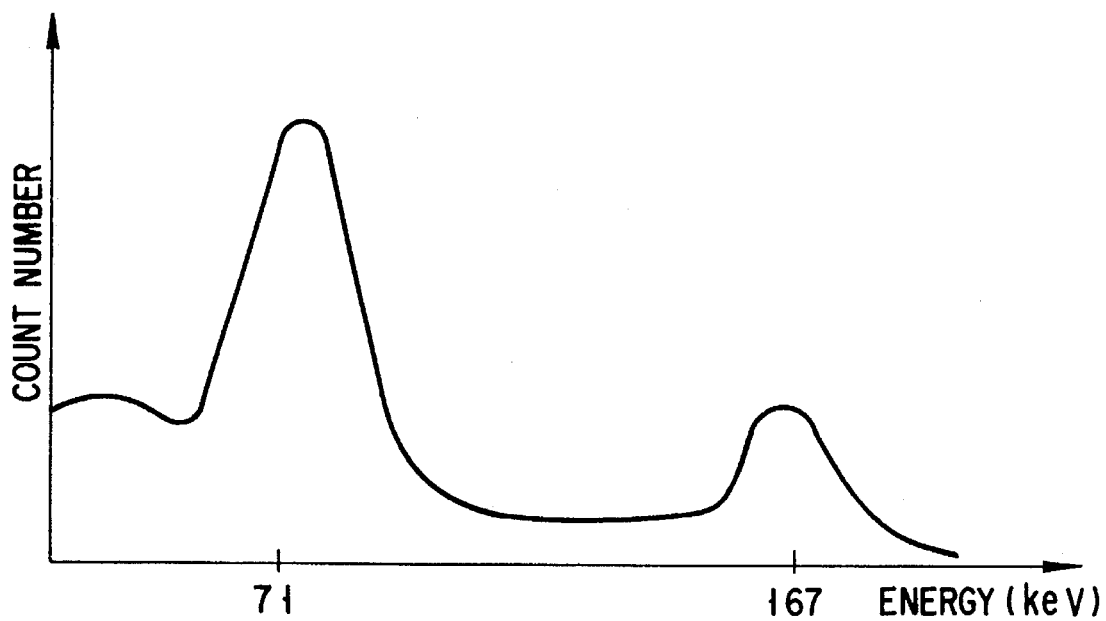
F I G. 4
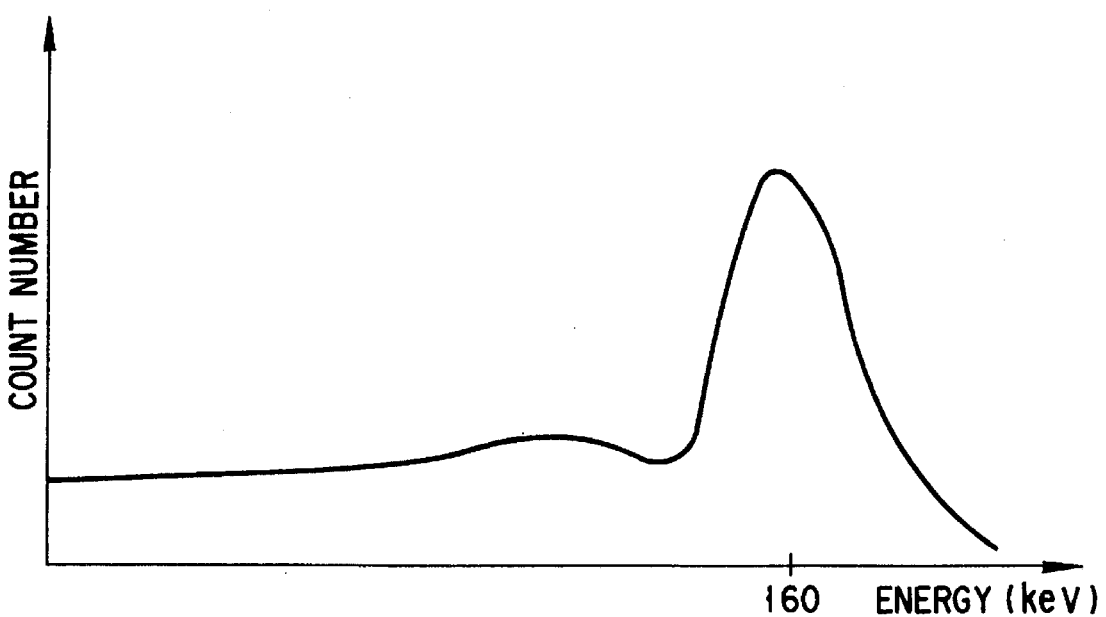
F I G. 5

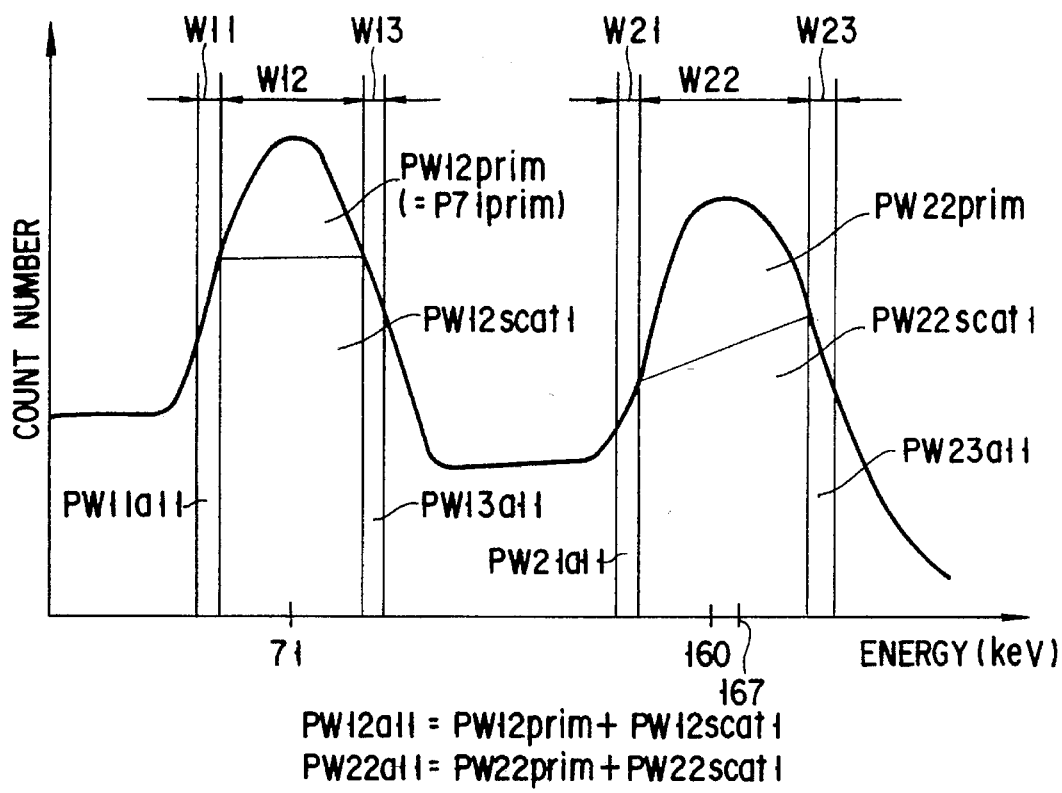
F I G. 6
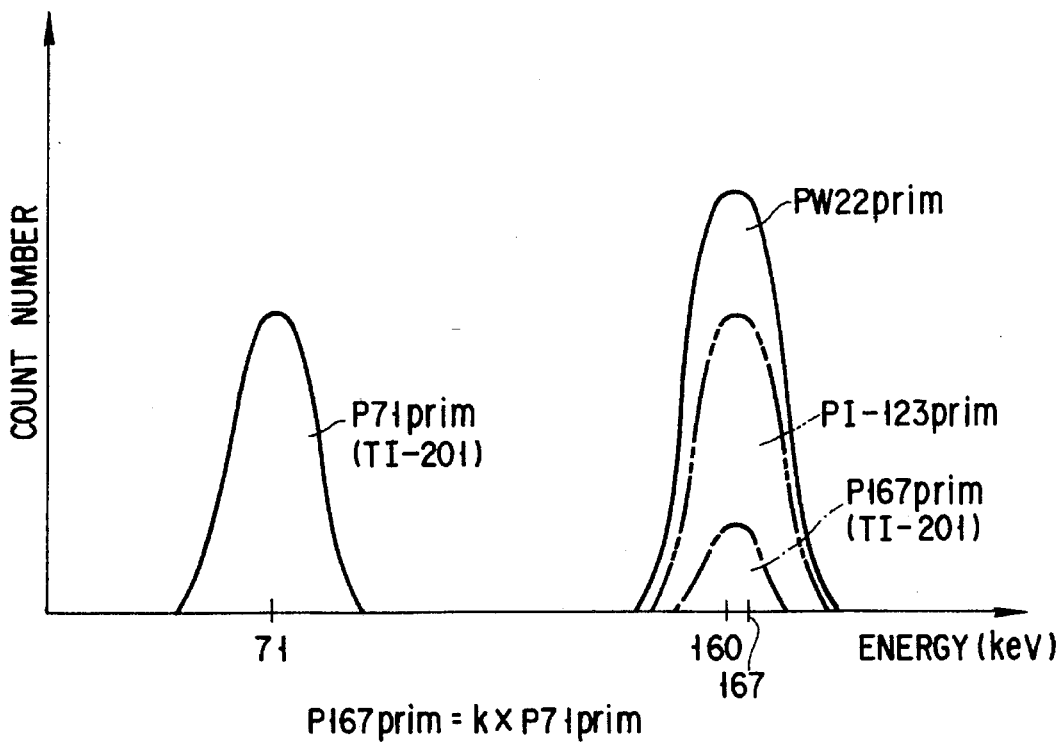
F I G. 7

SCINTILLATION CAMERA

BACKGROUND OF THE INVENTION

1. Field of the Invention

The present invention relates to a scintillation camera for visualizing a spatial distribution of radioisotope (RI) dosed in a test body, in the form of an image.

2. Description of the Related Art

Nuclear medical diagnostics use the property of RI or labeled compounds thereof that they are selectively absorbed by particular tissues and internal organs of a test body to measure γ rays emitted by RI from a device outside the test body and visualize the spatial distribution (i.e., scintigram) of RI for making diagnosis. These diagnostics enable diagnosis concerning physiological functions and metabolic functions of tissues and internal organs. A scintillation camera realizes these diagnostics.

The energy distribution of γ rays emitted by RI spreads around a center of a photo-peak specific to the RI. The scintillation camera comprises a window circuit for registering only the γ rays which have an energy ranging within a window (i.e., an energy band) defined by a predetermined width from the center of the photo-peak.

In these nuclear medical diagnostics, proposals have been made in recent days as to effectiveness of comparing scintigrams of respective kinds of RI with each other after plural kinds of RI are simultaneously dosed to a test body. However, these proposals contain a problem concerning a cross-talk as follows.

Explanation will be made supposing a case in which two kinds of RI, Tl-201 and I-123 are dosed. The RI I-123 has an inherent photo-peak of 160 keV, and has a window set around the center of 160 keV. The other RI Tl-201 has two inherent photo-peaks of 71 keV and 167 keV. With respect to Tl-201, two windows are set, one being set around the center of 71 keV and the other being set around the center of 167 keV. Here, the window of I-123 and the latter window of Tl-201 around the center of 167 keV overlap each other. Therefore, γ rays from I-123 and Tl-201 cannot be distinguished from each other. This is called a cross-talk.

A conventional measure for solving the above problem is as follows. Firstly, a large window is set which combines the window of I-123 with the window of Tl-201 around the center of 167 keV, and γ rays in the large window are registered. Then, the count number of γ rays within the large window is distributed for I-123 and Tl-201, in accordance with a ratio of count numbers for I-123 and Tl-201 within the large window which are separately and previously measured with use of a phantom, thereby to estimate the count numbers of I-123 and Tl-201.

However, the conventional method as mentioned above attains only a low accuracy since the ratio obtained by using a phantom differs from an actual test body.

SUMMARY OF THE INVENTION

The object of the present invention is to provide a scintillation camera which solves the problem concerning a cross-talk generated when plural kinds of RI are simultaneously dosed.

According to a first aspect of the invention, there is provided a scintillation camera comprising: a camera body for detecting γ rays from first RI and second RI dosed to a test body, the first RI having first and second photo-peaks and the second RI having a third photo-peak close to the second photo-peak; energy calculation means for calculating an energy of γ rays on the basis of an output from the camera body; position calculation means for calculating injection positions of the γ rays on the basis of an output from the camera body; count means connected to outputs of the energy calculation means and the position calculation means, for counting a first injection number relating to γ rays having an energy within a first window including the first photo-peak, for every injection position, and for counting a second injection number relating to γ rays having an energy within a second window including the second and third photo-peaks, for every injection position; means for obtaining a third injection number on the basis of the first injection number and a predetermined coefficient; first image forming means for forming a first image relating to the first RI the first injection number and the third injection number; and second image forming means for forming a second image relating to the second RI on the basis of the third injection number and the second injection number.

According to a second aspect of the invention, there is provided a scintillation camera comprising: a camera body for detecting γ rays from first RI and second RI dosed to a test body in a plurality of directions surrounding the test body, the first RI having first and second photo-peaks and the second RI having a third photo-peak close to the second photo-peak; energy calculation means for calculating an energy of γ rays on the basis of an output from the camera body; position calculation means for calculating injection positions of the γ rays on the basis of an output from the camera body; count means connected to outputs of the energy calculation means and the position calculation means, for counting a first injection number relating to γ rays having an energy within a first window including the first photo-peak, for every injection position and direction, and for counting a second injection number relating to γ rays having an energy within a second window including the second and third photo-peaks, for every injection position and direction; means for obtaining a third injection number on the basis of the third injection number and a predetermined coefficient; means for obtaining a fourth injection number relating to the first RI on the basis of the first injection number and the third injection number; means for obtaining a fifth injection number on the basis of the second injection number and the third injection number; reconstruction means for reconstructing a first section image relating to the first RI on the basis of the fourth injection number, and for reconstructing a second section image relating to the second RI on the basis of the fifth injection number.

According to a third aspect of the invention, there is provided a scintillation camera comprising: a camera body for detecting γ rays from first RI and second RI dosed to a test body in a plurality of directions surrounding the test body, the first RI having first and second photo-peaks and the second RI having a third photo-peak close to the second photo-peak; energy calculation means for calculating an energy of γ rays on the basis of an output from the camera body; position calculation means for calculating injection positions of the γ rays on the basis of an output from the camera body; count means connected to outputs of the energy calculation means and the position calculation means, for counting a first injection number relating to γ rays having an energy within a first window including the first photo-peak, for every injection position and direction, and for counting a second injection number relating to γ rays having an energy within a second window including the second and third photo-peaks, for every injection position and direction; reconstruction means for reconstructing a first section image on the basis of the first injection number, and for reconstructing a second section image on the basis of the second injection number; means for obtaining a third section image on the basis of the first section image and a predetermined coefficient; means for forming a section image relating to the first RI on the basis of the first section image and the third section image; and means for forming a section image relating to the second RI on the basis of the third section image and the second section image.

In the invention according to the first aspect, even when first RI having a first photo-peak and a second photo-peak and second RI having a third photo-peak close to the second photo-peak are simultaneously dosed to a test body, a problem of a cross-talk occurring in the vicinity of the second and third photo-peaks can be solved, and a first image relating to the first RI and a second image relating to the second RI can respectively be prepared. A first injection number is the number of energy injections in the vicinity of the first photo-peak, among all the γ rays emitted by the first RI. A second injection number is the number of energy injections in the vicinity of the second photo-peak among γ rays emitted by the first RI, (and further energy injections in the vicinity of the third photo-peak among γ rays emitted by the second RI cross-talk. In order to solve the problem of this cross-talk, injection numbers of both RI must be separated.

Also, in the invention according to the first aspect, the injection number in the vicinity of the second photo-peak relating to the first RI is obtained based on multiplying an injection number with a predetermined coefficient. Therefore, the injection number of all γ rays emitted from the first RI is obtained. In addition, all the γ rays emitted from the second RI can be obtained on the basis of the third injection number and the second injection number. The problem of cross-talk can be solved thereby.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a perspective view showing a scintillation camera of a preferred embodiment according to the present invention;

FIG. 2 is a block diagram of a diffusion ray correcting section of FIG. 1;

FIG. 3 is a block diagram of a separate image forming section of FIG. 1;

FIG. 4 is a graph showing an energy spectrum relating to a certain position when only Tl-201 is dosed;

FIG. 5 is a graph showing an energy spectrum relating to a certain position when only I-123 is dosed;

FIG. 6 is a graph showing an energy spectrum relating to a certain position when both of Tl-201 and I-123 are dosed; and FIG. 7 is a graph showing an energy spectrum after correcting diffusion rays corresponding to FIG. 6.

DETAILED DESCRIPTION OF THE PREFERRED EMBODIMENTS

In the following, a preferred embodiment according to the present invention will be explained with reference to the drawings. Typical RI Tl-201 and I-123 are simultaneously dosed in this embodiment. As shown in FIG. 4, Tl-201 as a first RI has two inherent photo-peaks of 71 keV and 167 keV. As shown in FIG. 5, I-123 as a second RI has an inherent photo-peak of 160 keV. A window set for 167 keV around the center of 167 keV overlaps a window for I-123 set around the center of 160 keV.

FIG. 1 shows an example of a structure of the preferred embodiment of a scintillation camera according to the present invention. A camera body 1 has a scintillator 2 using, for example, NaI as fluorescent material. In front of the scintillator 2, a collimator is provided which has a lead plate in which a number of parallel apertures are opened. Behind the scintillator 2, a plurality of opto-electronic multiplying tubes (PMT) 5 are arranged in a matrix. When γ rays emitted from RI in a test body in a particular direction enter into a scintillator 2, fluorescent material irradiates light at the position where the rays enter. This light is injected into all of the PMT 5 through a light guide 4. The PMT 5 generate pulses having an amplitude proportional to the injection light.

Pulses from all the PMT 5 are individually received by an energy calculation section 6 and a position calculation section 7. The energy calculation section 6 adds all of the outputs of the PMT 5 to each other, thereby to obtain a Z signal proportional to the energy of the injected γ ray. The position calculation section 7 calculates the injection positions (X, Y) of the γ ray, on the basis of a spatial change of a pulse amplitude. Specifically, in this position calculation, when fluorescent material irradiates exactly below a certain PMT 5, the amplitude of the pulse generated by the certain PMT 5 is the largest among the amplitudes of the pulses generated by the PMTs 5. Otherwise, when fluorescent material irradiates at the center of positions of three PMTs 5, the pulses generated by the three PMTs have an equal amplitude. This is a substantial principle of the position calculation.

A Z-signal and a position signal (X, Y) are received by a diffusion ray correction section 8. The diffusion ray correction section 8 subtracts a number of diffusion rays PW12scat1 from the count number (injection number) of γ rays having the energy within the window W12 for Tl-201 set around the center of 71 keV, for every position (X, Y), thereby to obtain the number PW12prim of γ rays having the energy within the window W12 directly injected into the camera body from Tl-201 in the test body, for every position (X, Y).

$$PW12all=PW12prim+PW12scat1 \qquad (1)$$

In addition, the diffusion rays correction section 8 subtracts the number of subtraction rays PW22scat1 from the count number (injection number) PW22all of γ rays having an energy within a large window set on the basis of 167 keV of Tl-201 and 160 keV of I-123. for every position (X, Y), thereby to obtain the number PW22prim of only the γ rays having an energy within the large window W22 directly injected into the camera body 1 from Tl-201 and I-123.

$$PW22all=PW22prim+PW22scat1 \qquad (2)$$

A separate image forming section 9 prepares an image (scintigram) PTl-201(X, Y) of only Tl-201 and an image (scintigram) PI-201(X, Y) of only I-123, on the basis of PW12prim (X, Y) and PW22prim (X, Y) obtained by the diffusion ray correction section 8. The images PT1-201 (X, Y) and PI-123 (X, Y) are displayed on a image display section 10, and is stored into a memory 11 of a magnetic disc device or the like.

FIG. 2 is a block diagram of the diffusion ray correction section 8. Various methods of correcting diffusion rays have already been practiced, and any of them can be adopted in this embodiment. Explanation will be made to a case using a correction method called a TEW method. Window sections 12 to 17 respectively output pulses when windows W11, W12, W13, W21, W22, and W23 contain Z signals from the energy section 6. As shown in FIG. 6, the window W12 is set, for example, so as to have a range of ±10% from the center of T1-201. The window W22 is set so as to have a relatively large range defined by the lowermost and uppermost values existing within a range of ±10% of the center 167 keV of I-123 and a range of ±10% of the center 160 keV of T1-201. The other windows W11, W13, W21, and W23 are specific to the TEW method and are arranged adjacent to the windows W12 and W22. They are, for example, set to a width of 5 keV. Since the windows W11, W12, W13, W21, and W22 do not overlap each other, a corresponding one of these windows generates a pulse in response to a Z signal.

The various sections described above may be implemented as elements of a general purpose computer operating under the control of software configuring the general purpose computer to achieve the above-noted operations of the various sections.

A counter 18 counts the number of pulses from a window section 12 for every position (X, Y), thereby to obtain the count number (injection number) PW11all (X, Y) of γ rays having an energy within the window W11. In addition, the counter 18 counts the number of pulses from the window section 13, for every position (X, Y), thereby to obtain the count number (injection number) PW12all (X, Y) having an energy within the window W12. In addition, the counter 18 counts the number of pulses from the window section 14 for every position (X, Y), thereby to obtain the count number (injection number) PW13all(X,Y) of γ rays having an energy within the window W13. Further, the counter 18 counts the number of pulses from the window section 15, thereby to obtain the count number (injection number) PW21all(X, Y) of γ rays having an energy within the window W21. Further, the counter 18 counts the number of pulses from the window section 16 for every position (X, Y), thereby to obtain the count number (injection number) PW22all(X, Y) of γ rays having an energy within the window W22. Also, the counter 18 counts the number of pulses from the window section 17 for every position (X, Y), thereby to obtain the count number (injection number) PW23all(X, Y) of γ rays having an energy within the window W23.

Diffusion component elimination section 19 estimates the diffusion ray number PW12scat1(X, Y) within the window W12, on the basis of the count number PW11all(X, Y) within the window W11 and the count number PW13all(X, Y) within the window W13. This diffusion ray number PW12scat1(X, Y) is obtained by approximately calculating the area of a trapezoid surrounded by the energy axis, the window W12, and a line connecting two cross-points of the energy spectrum and the window W12. This trapezoid defined by a height of W12, a lower edge of PW11all(X, Y)/W11, and an upper edge of PW13all(X, Y)/W13, so that the area of the trapezoid, i.e., PW12scat1(X, Y) is given by a relation (3) as follows:

$$PW12scat1(X,Y) = \{(PW11all(X,Y)/W11 + PW13all(X,Y)/W13) \times W12\}/2 \quad (3)$$

In the same manner, the diffusion component elimination section 19 estimates the diffusion ray number PW22scat1(X, Y) within the window W22, on the basis of the count number PW21all(X, Y) within the window W21 and the count number PW23all(X, Y) within the window W23, from a relation (4) as follows:

$$PW22scat1(X,Y) = \{(PW21all(X,Y)/W21 + PW23all(X,Y)/W23) \times W22\}/2 \quad (4)$$

Further, the diffusion component elimination section 19 subtracts the diffusion ray number PW12scat1(X, Y) from the PW12all(X, Y) in accordance with the relation (1), thereby to obtain the number PW12prim(X, Y) of only the γ rays which are directly injected into the camera body 1 from T1-201 and have an energy within the window W12. In addition, the diffusion component elimination section 19 subtracts the diffusion ray number PW22scat1(X, Y) from the PW22all(X, Y) in accordance with the relation (2), thereby to obtain the number PW22prim(X, Y) of only the γ rays which are directly injected into the camera body 1 from T1-201 or I-123 and have an energy within the large window W22.

FIG. 3 is a block diagram showing the separate image forming section 9. FIG. 7 shows an energy spectrum relating to a certain position after correcting the diffusion rays. In FIG. 7, the energy spectrum in the vicinity of the photo-peak 167 keV is indicated by a dashed line, while the energy spectrum in the vicinity of the photo-peak 160 keV is indicated by an alternate long and two short dashes line.

Here, the count number of only the rays from T1-201 in the vicinity of 71 keV, counted at a certain position, is expressed as P71prim(X, Y) and the count number of only the rays from T1-201 in the vicinity of 167 keV, counted at a certain position, is expressed as P167prim(X, Y). Further, the P71prim(X, Y) is equal to the number of γ rays having an energy within the window W12, so that the following relation (5) is obtained:

$$P71prim(X, Y)=PW12prim(X, Y) \quad (5)$$

An image PT1-201(X, Y) of only the rays from T1-201 is a sum of the count numbers in the vicinity of two photo-peaks, and is therefore defined by the relation (6):

$$PT1-201(X, Y)=P71prim(X, Y)+P167prim(X, Y) \quad (6)$$

From the relation (5), the relation (6) is changed into the following relation (7):

$$PT1-201(X, Y)=PW12prim(X, Y)+P167prim(X, Y) \quad (7)$$

Further, the count number of only the rays from I-123 in the vicinity of 160 keV is expressed as P160prim(X, Y). Since the count number PW22prim(X, Y) within the large window W22 is a sum of the number of γ rays from T1-201 in the test body and the number of γ rays from I-123, this count number is defined by a relation (8) as follows:

$$PW22prim(X, Y)=P167prim(X, Y)+P160prim(X, Y) \quad (8)$$

The image PI-123(X, Y) of only the rays from I-123 is the count number of γ rays in the vicinity of the photo-peak, and is expressed by a relation (9) as follows:

$$PI-123(X, Y)=P160prim(X, Y) \quad (9)$$

From the relation (8), the relation (9) is changed into a relation (10) as follows:

$$PI\text{-}123(X, Y) = PW22prim(X, Y) - P167prim(X, Y) \quad (10)$$

Thus, the image PT1-201(X, Y) of only the rays from T1-201 is obtained from the relation (7), and the image PI-123(X, Y) is obtained from the relation (10). Specifically, the count number PW12prim(X, Y) within the window W12 and the count number PW22prim(X, Y) within the window W22 are well-known as outputs from the diffusion ray correction section 8. Therefore, it will be easily understood that the image PT1-201(X, Y) of only the rays from T1-201 can be separated from the image PI-123(X, Y) of the rays from I-123, if only the count number P167prim(X, Y) of the rays from T1-201 in the vicinity of 167 keV is obtained.

The count number P167prim(X, Y) of the rays only from T1-201 in the vicinity of 167 keV can be obtained by a disintegration rate multiplication section 20. As is well-known, the disintegration rate between 71 keV and 167 keV of T1-201 is 96:11. Therefore, the disintegration rate k of 167 keV to 71 keV of T1-201 can be obtained as a rate of 11/96. This disintegration rate k is a value inherent to T1-201. As a result, P167prim(X, Y) can be obtained by a relation (11) as follows:

$$\begin{aligned} P167prim(X, Y) &= k \times P71prim(X, Y) \quad (11) \\ &= k \times PW12prim(X, Y) \end{aligned}$$

The P167prim(X, Y) obtained by the disintegration multiplication section 20 is sent to a T1-201 image forming section 21 and an I-123 image forming section 22. The T1-201 image forming section 21 prepares an image PT1-201(X, Y) of T1-201 in accordance with the above relation (7) and an image PI-123(X, Y) of I-123 in accordance with the above relation (10).

Thus, according to this embodiment, even when plural kinds of RI which have photo-peaks adjacent to each other are simultaneously dosed, the count numbers are separated for every kind of RI, images of respective kinds of RI can be obtained.

In the above embodiment, although the present invention is applied to a scintillation camera, the present invention can be applied to a SPECT apparatus. The "SPECT" is an abbreviation of Single Photon Emission Computed Tomography, and therefore, the SPECT apparatus counts γ rays from a test body can be counted at various angles, and the count numbers thus obtained are subjected to reconstruction processing, with these numbers being taken as projection data, like in an X-ray CT scanner, thereby to obtain a γ ray distribution in a lateral section (i.e., a section image). If the present invention is applied to an SPECT apparatus, it is possible to obtain a section image of only the rays from T1-201 relating to a certain cross-section and a section image of only the rays from I-123. In the above embodiment, although the count numbers are merely identified by positions (X, Y), the SPECT apparatus identify the count numbers by means of positions and projection directions (X, Y, θ). When the SPECT apparatus is of a rotation type in which the camera body 1 rotates around a test body, the value θ is obtained by an angle detector such as a rotary encoder for detection the rotation angle. Otherwise, when the SPECT apparatus is of a specialized SPECT type in which a plurality of γ ray counters are disposed in a ring-like arrangement around the test body, the value γ can be obtained as a channel of γ rays. The diffusion ray correction section 8 corrects diffusion rays for every direction (X, Y, θ), thereby to obtain PW12prim(X, Y, θ) and PW22prim(X, Y, θ). Then, the separate image forming section 9 uses PW12prim(X, Y, θ) and PW22prim(X, Y, θ) to obtain the count number PT1-201(X, Y, θ) for T1-201 and the count number PW22prim(X, Y, θ) for I-123. A reconstruction processing section will be provided at an output of the separate image forming section 9. The reconstruction processing section reconstructs, on the basis of PT1-201(X, Y, θ) for 360° or 180° with respect to a certain cross-section, a section image of only the rays from T1-201 which relates to the certain cross-section. Also, the reconstruction processing section reconstructs, on the basis of PI-123(X, Y, θ) for 360° or 180° with respect to a certain cross-section, a section image of only the rays from I-123 which relates to the certain cross-section. These section images are displayed on the image display section 10, and are stored into a memory section 11 of a magnetic disc device or the like.

In case where the present invention is applied to an SPECT apparatus, a cross-talk may be corrected after reconstruction processing, in place of correcting the cross-talk before reconstruction processing as explained above. In this case, a reconstruction processing section will be provided at an output of the diffusion ray correction section 8. The reconstruction processing section reconstructs a first section image relating to the count number of rays in the vicinity of the photo-peak 71 keV of T1-201, on the basis of PW12prim(X, Y, θ) for 360° or 180° with respect to a certain cross-section. Also, the reconstruction processing section reconstructs a second section image relating to the count number of rays passing through the large window W22 from T1-201 or I-123, on the basis of PW22prim(X, Y, θ) for 360° or 180° with respect to a certain cross-section. The separation image forming section 9 multiplies each pixel of the first section image by a disintegration rate, as represented by the relation (11), thereby to obtain a third section image relating to the count number in the vicinity of the photo-peak 167 keV of T1-201. The image forming section 21 of the separate image forming section 9 adds the first and third images to each other between frames, as shown in the relation (7), thereby to prepare a section image of only the rays from T1-201 with respect to the relevant cross-sections. In addition, the image forming section 22 of the separate image preparation section 9 subtracts the third section image from the second section image between frames, thereby to prepare a section image of rays only from I-123 with respect to the relevant cross-sections.

The present invention is not limited to the embodiments described above, but may be practiced with various modifications.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A scintillation camera comprising:

a camera body for detecting γ rays radiated from first RI and second RI dosed to a subject, γ rays radiated from said first RI being distributed with each of first and second energy-peaks, γ rays radiated from said second RI being distributed with a third energy-peak close to the second energy-peak;

energy calculation means for calculating an energy of each of the γ rays on the basis of an output from the camera body;

position calculation means for calculating injection positions of each of the γ rays on the basis of an output from the camera body;

first count means for counting a first injection number relating to γ rays having an energy within a first energy window including the first energy-peak and a second injection number relating to γ rays having an energy within a second energy window including the second and third energy-peaks, for every injection position on the basis of outputs of said energy calculation means and said position calculation means;

second count means for counting a third injection number relating to γ rays having an energy within a third energy window, a fourth injection number relating to γ rays having an energy within a fourth energy window on the basis of outputs of said energy calculation means and said position calculation means, the third energy window and the fourth energy window arranged adjacent respective ends of the first energy window;

third count means for counting a fifth injection number relating to γ rays having an energy within a fifth energy window, and a sixth injection number relating to γ rays having an energy within a sixth energy window on the basis of outputs of said energy calculation means and said position calculation means;

means for obtaining a seventh injection number on the basis of the first injection number, the third injection number and the fourth injection number, said seventh injection number obtained without scatter rays;

means for obtaining an eighth injection number on the basis of the second, fifth and sixth injection numbers, said eighth injection number obtained without scatter rays and without γ rays from said first RI;

first image forming means for forming a first image relating to the first RI on the basis of the seventh injection number and a product of multiplying a predetermined coefficient with the seventh injection number; and second image forming means for forming a second image relating to the second RI on the basis of subtracting the product of multiplying the predetermined coefficient with the seventh injection number from the eighth injection number.

2. A scintillation camera according to claim 1, wherein the predetermined coefficient is a disintegration rate of the second energy-peak to the first energy-peak.

3. A scintillation camera according to claim 1, wherein the first RI is Tl-201, the first energy-peak is 71 keV, the second energy-peak is 167 keV, the second RI is I-123 the third energy-peak is 160 keV.

4. A scintillation camera according to claim 3, wherein the predetermined coefficient is a disintegration rate 11/96 of 167 keV to 71 keV.

5. A scintillation camera according to claim 1, wherein the first count means comprises a first energy window means for outputting a pulse when the energy calculated by the energy calculation means is included in the first energy window, second window means for outputting a pulse when the energy calculated by the energy calculation means is included in the second energy window, and a first counter for counting a number of pulses outputted from the first window means to obtain the first injection number, and a second counter for counting a number of pulses outputted from the second window means to obtain the second injection number.

6. A scintillation camera according to claim 1, wherein the first energy window is set to have a predetermined range centered on the first energy-peak, and the second energy window is set to have a larger range than the first energy window, the larger range set by combining a predetermined range centered on the second energy-peak with a predetermined range centered on the third energy-peak.

7. A scintillation camera comprising:

a camera body for detecting γ rays radiated from first RI and second RI dosed to a subject, γ rays radiated from said first RI being distributed with each of first and second energy-peaks, γ rays radiated from said second RI being distributed with a third energy-peak close to the second energy-peak;

energy calculation means for calculating an energy of each of the γ rays on the basis of an output from the camera body;

first count means for counting a first injection number relating to γ rays having an energy within a first energy window including the first energy-peak and a second injection number relating to γ rays having an energy within a second energy window including the second and third energy-peaks, for every injection position on the basis of outputs of said energy calculation means and said position calculation means;

second count means for counting a third injection number relating to γ rays having an energy within a third energy window, a fourth injection number relating to γ rays having an energy within a fourth energy window on the basis of outputs of said energy calculation means and said position calculation means, the third energy window and the fourth energy window arranged adjacent respective ends of the first energy window;

third count means for counting a fifth injection number relating to γ rays having an energy within a fifth energy window, and a sixth injection number relating to γ rays having an energy within a sixth energy window on the basis of outputs of said energy calculation means and said position calculation means;

means for obtaining a seventh injection number on the basis of the first injection number, the third injection number and the fourth injection number, said seventh injection number obtained without scatter rays;

means for obtaining an eighth injection number on the basis of the second, fifth and sixth injection numbers, said eighth injection number obtained without scatter rays and without γ rays from said first RI;

reconstruction means for reconstructing a first image relating to the first RI on the basis of the seventh injection number and a product of multiplying the predetermined coefficient by the seventh injection number, and for reconstructing a second section image relating to the second RI on the basis of subtracting the product of multiplying the predetermined coefficient with the seventh injection number from the eighth injection number.

8. A scintillation camera according to claim 7, wherein the predetermined coefficient is a disintegration rate of the second energy-peak to the first energy-peak.

9. A scintillation camera according to claim 7, wherein the first RI is Tl-201, the first energy-peak is 72 keV, the second energy-peak is 167 keV, the second RI is I-123, and the third energy-peak is 160 keV.

10. A scintillation camera according to claim 9, wherein the predetermined coefficient is a disintegration rate 11/96 of 167 keV to 71 keV.

11. A scintillation camera according to claim 7, wherein the first count means comprises a first window means for outputting a pulse when the energy calculated by the energy calculation means is included in the first energy window, second window means for outputting a pulse when the energy calculated by the energy calculation means is included in the second energy window, and a first counter for counting a number of pulses outputted from the first window means and a second counter for counting a number of pulses outputted from the second window means.

12. A scintillation camera according to claim 7, wherein the first window is set to have a predetermined range centered on the first energy-peak, and the second window is set to have a larger range than the first window, said larger range set by combining a predetermined range centered on the second energy-peak with a predetermined range centered on the third energy-peak.

13. A scintillation camera comprising:

a camera body for detecting γ rays radiated from first RI and second RI dosed to a subject, γ rays radiated from said first RI being distributed with each of first and second energy-peaks, γ rays radiated from said second RI being distributed with a third energy-peak close to the second energy-peak;

energy calculation means for calculating an energy of each of the γ rays on the basis of an output from the camera body;

position calculation means for calculating an energy of each of the γ rays on the basis of an output from the camera body;

first count means for counting a first injection number relating to γ rays having an energy within a first energy window including the first energy-peak and a second injection number relating to γ rays having an energy within a second energy window including the second and third energy-peaks, for every injection position on the basis of outputs of said energy calculation means and said position calculation means;

second count means for counting a third injection number relating to γ rays having an energy within a third energy window, a fourth injection number relating to γ rays having an energy within a fourth energy window on the basis of outputs of said energy calculation means and said position calculation means, the third energy window and the fourth energy window arranged adjacent respective ends of the first energy window;

third count means for counting a fifth injection number relating to γ rays having an energy within a fifth energy window, and a sixth injection number relating to γ rays having an energy within a sixth energy window on the basis of outputs of said energy calculation means and said position calculation means;

means for obtaining a seventh injection number on the basis of the first injection number, the third injection number and the fourth injection number, said seventh injection number obtained without scatter rays;

means for obtaining an eighth injection number on the basis of the second, fifth and sixth injection numbers, said eighth injection number obtained without scatter rays and without γ rays from said first RI;

reconstruction means for reconstructing a first image on the basis of the seventh injection number, and for reconstructing a second image on the basis or the eighth injection number;

means for obtaining a third image on the basis of the first image and a predetermined coefficient, the first image being multiplied by the predetermined coefficient;

means for forming an image relating to the first RI on the basis of the first image and the third image; and means for forming an image relating to the second RI on the basis of the third image and the second image.

14. A scintillation camera according to claim 13, wherein the predetermined coefficient is a disintegration rate of the second energy-peak to the first energy-peak.

15. A scintillation camera according to claim 13, wherein the first RI is Tl-201, the first energy-peak is 71 keV, the second energy-peak is 167 keV, the second RI is I-123, and the third energy-peak is 160 keV.

16. A scintillation camera according to claim 15, wherein the predetermined coefficient is a disintegration rate 11/96 of 167 keV to 71 keV.

17. A scintillation camera according to claim 13, wherein the first count means comprises a first window means for outputting a pulse when the energy calculated by the energy calculation means is included in the first energy window, second window means for outputting a pulse when the energy calculated by the energy calculation means is included in the second energy window, and a first counter for counting a number of pulses outputted from the first window means and a second counter for counting a number of pulses outputted from the second window means.

18. A scintillation camera according to claim 13, wherein the first energy window is set to have a predetermined range centered on the first energy-peak, and the second energy window is set to have a larger range than the first energy window, said larger range set by combining a predetermined range centered on the second energy-peak with a predetermined range centered on the third energy-peak.

* * * * *